US007620435B2

(12) United States Patent
Tou et al.

(10) Patent No.: US 7,620,435 B2
(45) Date of Patent: Nov. 17, 2009

(54) COMMUNICATION MODULE WITH RETRACTABLE ANTENNAE AND METHOD THEREFOR

(75) Inventors: Jarvis C. Tou, San Diego, CA (US); Mark D. Davenport, Rancho Santa Fe, CA (US); Paul S. Collins, Temecula, CA (US)

(73) Assignee: Intel Corporation, Santa Clara, CA (US)

(*) Notice: Subject to any disclaimer, the term of this patent is extended or adjusted under 35 U.S.C. 154(b) by 186 days.

(21) Appl. No.: 09/745,923

(22) Filed: Dec. 22, 2000

(65) Prior Publication Data

US 2002/0082061 A1 Jun. 27, 2002

(51) Int. Cl.
*H04M 1/00* (2006.01)

(52) U.S. Cl. .............. 455/575.7; 455/575.4; 455/575.1; 455/575.5; 455/90.3

(58) Field of Classification Search ................. 455/575, 455/574, 89, 90, 558, 556, 565, 550, 95, 455/90.3, 575.1, 575.4, 575.5, 575.6, 575.7; 343/702, 795, 841, 763, 880, 883; 439/131, 439/676, 946, 630, 55, 76, 135
See application file for complete search history.

(56) References Cited

U.S. PATENT DOCUMENTS

| | | | | | |
|---|---|---|---|---|---|
| 4,471,493 | A | * | 9/1984 | Schober | 455/562 |
| 5,361,061 | A | * | 11/1994 | Mays et al. | 340/7.54 |
| 5,594,952 | A | * | 1/1997 | Virtuoso et al. | 455/557 |
| 5,615,259 | A | * | 3/1997 | Gilbert | 379/433.13 |
| 5,628,055 | A | * | 5/1997 | Stein | 455/575 |
| 5,689,821 | A | * | 11/1997 | Shimazaki | 708/109 |
| 5,809,243 | A | * | 9/1998 | Rostoker et al. | 709/217 |
| 5,841,628 | A | * | 11/1998 | Alpert et al. | 361/600 |
| 5,867,127 | A | * | 2/1999 | Black et al. | 343/702 |
| 5,880,696 | A | * | 3/1999 | Koleda | 343/702 |
| 5,898,933 | A | * | 4/1999 | Kaschke | 455/575 |
| 5,918,162 | A | * | 6/1999 | Ito et al. | 455/82 |
| 5,918,163 | A | | 6/1999 | Rossi | |
| 5,983,119 | A | * | 11/1999 | Martin et al. | 455/575 |
| 6,006,117 | A | * | 12/1999 | Hageltorn et al. | 455/575 |
| 6,043,781 | A | * | 3/2000 | Toh et al. | 343/702 |
| 6,172,645 | B1 | * | 1/2001 | Hollander et al. | 343/702 |
| 6,181,284 | B1 | * | 1/2001 | Madsen et al. | 343/702 |
| 6,295,031 | B1 | * | 9/2001 | Wallace et al. | 343/702 |

(Continued)

FOREIGN PATENT DOCUMENTS

DE 42 44 967 C2 8/1999

(Continued)

OTHER PUBLICATIONS

PCT Search Report dated Oct. 30, 2002.

(Continued)

*Primary Examiner*—Tan Trinh
(74) *Attorney, Agent, or Firm*—Trop, Pruner & Hu, P.C.

(57) ABSTRACT

Briefly, in accordance with one embodiment of the invention, a communication module may include an antennae unit that may extracted or extended from and inserted into the communication module. The antennae unit may be used to disable the operation of the communication module when the antennae unit is inserted into the communication module.

5 Claims, 5 Drawing Sheets

U.S. PATENT DOCUMENTS

| | | | | |
|---|---|---|---|---|
| 6,297,778 | B1 * | 10/2001 | Phillips et al. | 343/702 |
| 6,336,039 | B1 * | 1/2002 | Usui et al. | 455/558 |
| 6,359,591 | B1 * | 3/2002 | Mou | 343/702 |
| 6,375,479 | B1 * | 4/2002 | Johnson et al. | 439/131 |
| 6,414,638 | B1 * | 7/2002 | Egashira | 343/702 |
| 6,428,347 | B1 * | 8/2002 | Johnson et al. | 439/492 |
| 6,509,876 | B1 * | 1/2003 | Jones et al. | 343/702 |
| 6,524,122 | B1 * | 2/2003 | Johnson et al. | 439/131 |
| 6,545,643 | B1 * | 4/2003 | Sward et al. | 343/702 |
| 6,847,830 | B1 * | 1/2005 | Vanderhelm et al. | 455/558 |
| 2001/0005179 | A1 * | 6/2001 | Hutchison | 343/763 |
| 2003/0100352 | A1 * | 5/2003 | Moles | 455/572 |
| 2003/0128167 | A1 * | 7/2003 | Beard et al. | 343/702 |
| 2003/0210199 | A1 * | 11/2003 | Sward et al. | 343/795 |
| 2005/0045755 | A1 * | 3/2005 | Romano | 241/95 |

FOREIGN PATENT DOCUMENTS

| | | | | |
|---|---|---|---|---|
| EP | 8 877 492 | A2 | | 11/1998 |
| EP | 0 936 694 | A2 | | 2/1999 |
| WO | WO 00/60755 | | * | 10/2000 |
| WO | WO 00/60755 | A1 | | 10/2000 |
| WO | WO 01/37437 | A2 | | 5/2001 |

OTHER PUBLICATIONS

Patent Application No. 018209823 Chinese Office Action dated Feb. 24, 2006.

* cited by examiner

COMMUNICATION MODULE WITH RETRACTABLE ANTENNAE AND METHOD THEREFOR

BACKGROUND

In some applications it may be desirable to connect a portable computing or communication devices, such as a laptop computer, personal digital assistant (PDA's), cell phone, etc., with a local network. This may be done, for example, by coupling the portable device to an antennae. The antennae may used in conjunction with a modem to provide wireless communication to a network or server.

However, conventional antennae structures suffer from several problems. For example, some antennae arrangements attach the antennae to the portable device such that the antennae extend externally from the device (e.g. the antennae may be attached such that it protrudes from the lid of a laptop computer). Such an arrangement may result in damage to the antennae while it is being transported or while it is in use. Additionally, regulations imposed by the Federal Aviation Administration (FAA) often require that wireless communication devices be disabled while an aircraft is in flight. Consequently, a passenger may have to stow the portable device during a flight to demonstrate that no wireless communications are being made.

Thus, there is a continuing need for better ways to provide wireless communications for a portable computing or communication device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
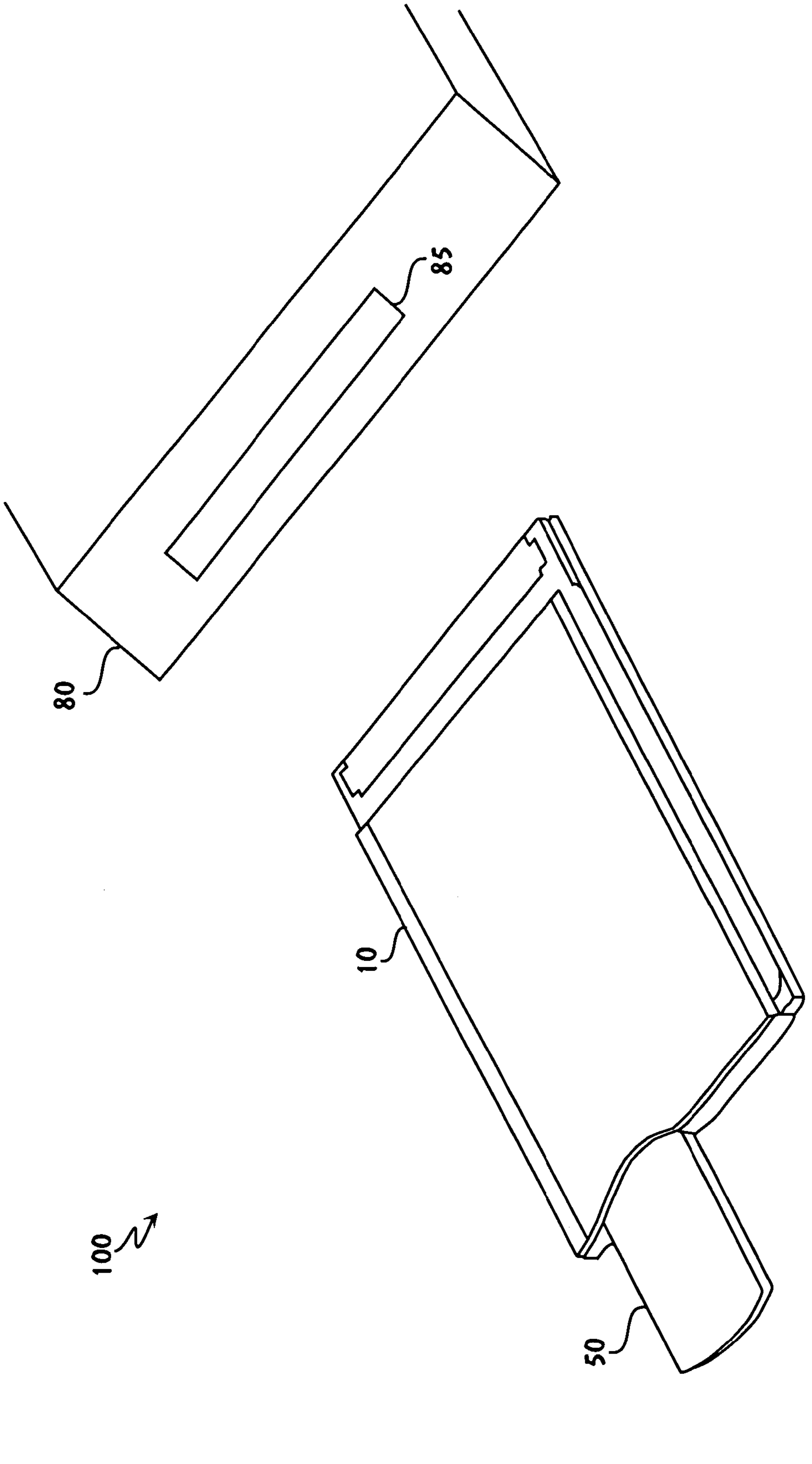
FIG. 1 is a illustration of a communication module in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may also mean that two or more elements are in direct physical or electrical contact. However, "coupled" may also mean that two or more elements are not in direct contact with each other, but yet still co-operate or interact with each other.

Turning to FIG. 1, an embodiment 100 in accordance with the present invention is described. Embodiment 100 may comprise a portable device 80 such as a mobile communication device (e.g., cell phone), a two-way radio communication system, a one-way pager, a two-way pager, a personal communication system (PCS), a portable computer, or the like. Although it should be understood that the scope and application of the present invention is in no way limited to these examples. Portable device 80 may comprise a memory, such as a static random access memory, that may be used to store instructions to be executed by a processor. For example, the memory may comprise instructions that allows the processor to run applications as desired by a user.

Embodiment 100 here includes a communication module 10 that may be used by portable device 80 as a radio or transceiver to provide a wireless communication to another device. For example, communication module 10 may be used by portable device 80 to connect to another portable device, to a local network, to the Internet, to a server, to a data storage medium, etc., although the scope of the present invention is not limited in this respect.

Communication module 10 may be part of portable device 80, or alternatively, may be removable as shown in FIG. 1. For example, communication module 10 may comprise an interface that allows communication module 10 to be coupled or connected to portable device 80. Although the scope of the present invention is not limited in this respect, communication module 10 may comprise a Personal Computer Memory Card International Association (PCMCIA) card that may be used to communicate with portable device 80. As a PCMCIA card, communication module 10 may be readily removed or inserted into a slot 85 on portable device 80. In alternative embodiments, communication module 10 may use parallel or serial communications to communicate with portable device 80.

Communication module 10 may comprise an antennae unit 50 that may be inserted into and extracted (e.g., extended) from communication module 10 as desired. Antennae unit 50 may be used to receive or transmit radio frequency (RF) signals, which, in turn, are processed or generated by communication module 10 to provide wireless communication for portable device 80. Additionally, and as explained in more detail below, antennae unit 50 may also be used to enable and disable the operation of communication module 10, although the scope of the present invention is not limited in this respect. For example, antennae unit 50 may be adapted such that when it is extended from communication module 10, it enables the operation of communication module 10. Likewise, antennae unit 50 may be adapted such that it disables the operation of communication module 10 when inserted into communication module 10.

Although the scope of the present invention is not limited in this respect, communication module 10 and antennae unit 50 may be adapted to use the Bluetooth™ communication protocol. In such an embodiment, communication module 10 may be adapted to transmit and receive wireless communications over a frequency range of about from about 1 MHz to 900 MHz. However, it should be understood that communication module 10 may use other communication protocols such as Direct Sequence—Code Division Multiple Access (DS-CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, and the like.

Figure 2:
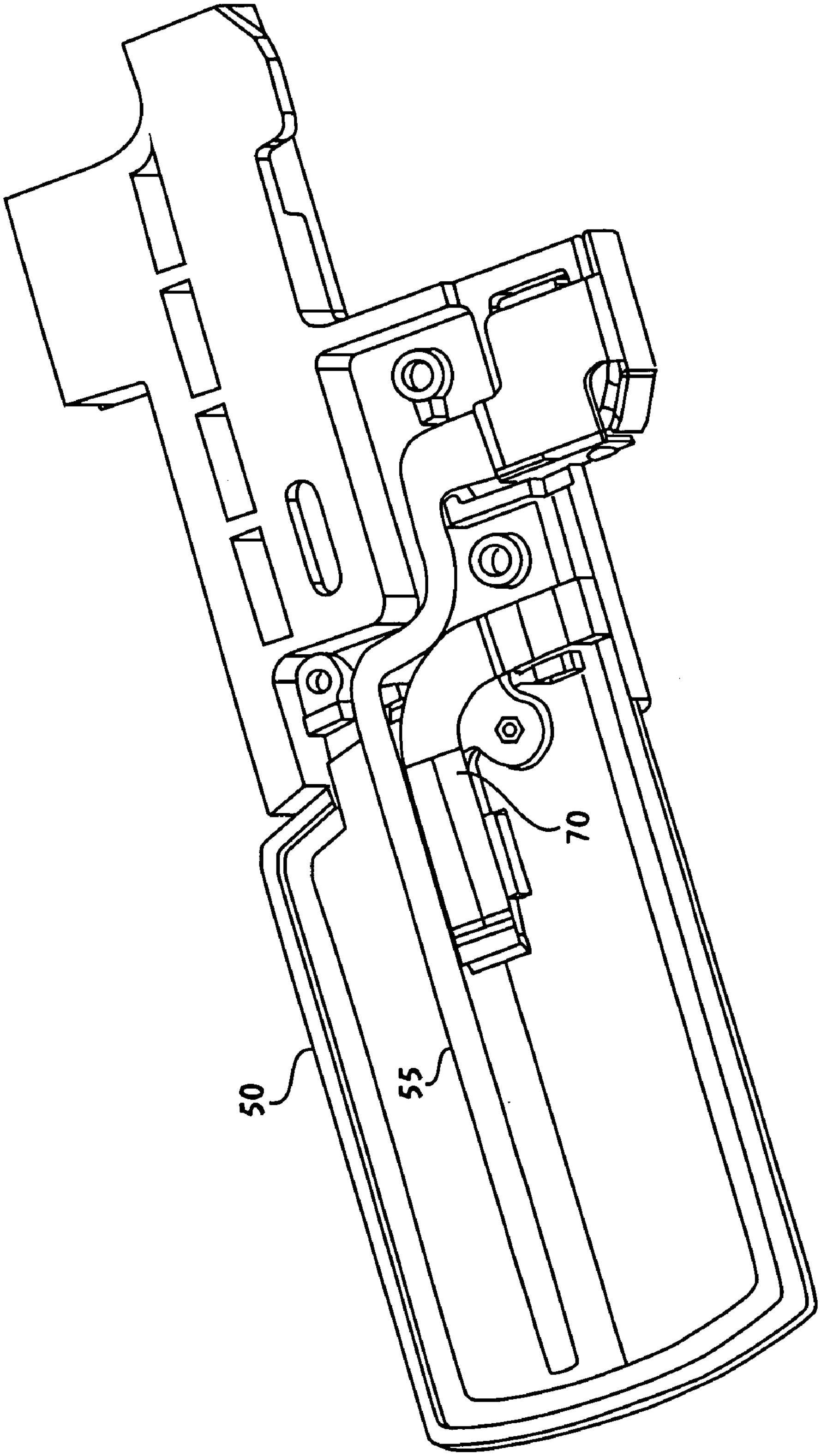
FIG. 2 is a partially open view of a portion of an antennae unit in accordance with an embodiment of the present invention.

Turning now to FIG. 2, a more detailed description of antennae unit 50 is provided. Antennae unit 50 may comprise an antennae 55 that may be of the proper length, proportions and arrangement to receive and/or transmit RF signals. Antennae unit 50 may also comprise a visual indicator that may be used to indicate whether communication module 10 is enabled or disabled(e.g. powered on or powered off). A visual indicator may be desirable in some applications to notify a user if communication module 10 is enabled or disabled. For example, a visual indicator may be used to demonstrate that communication module 10 is not transmitting any RF signals. This may beneficial if the user is in an environment where the user is not permitted to transmit RF signals, such as may be the case if the user is on an aircraft. Although the scope of the present invention is not limited in this respect, the visual indicator may comprise a light emitting diode (LED) and a light tunnel 70 that may be used to indicate if antennae unit 50 is in the extracted in inserted position. In alternative embodiments, the visual indicator may comprise more than one LED that may be used to communicate different information such as whether the module is powered up.

Figure 3:
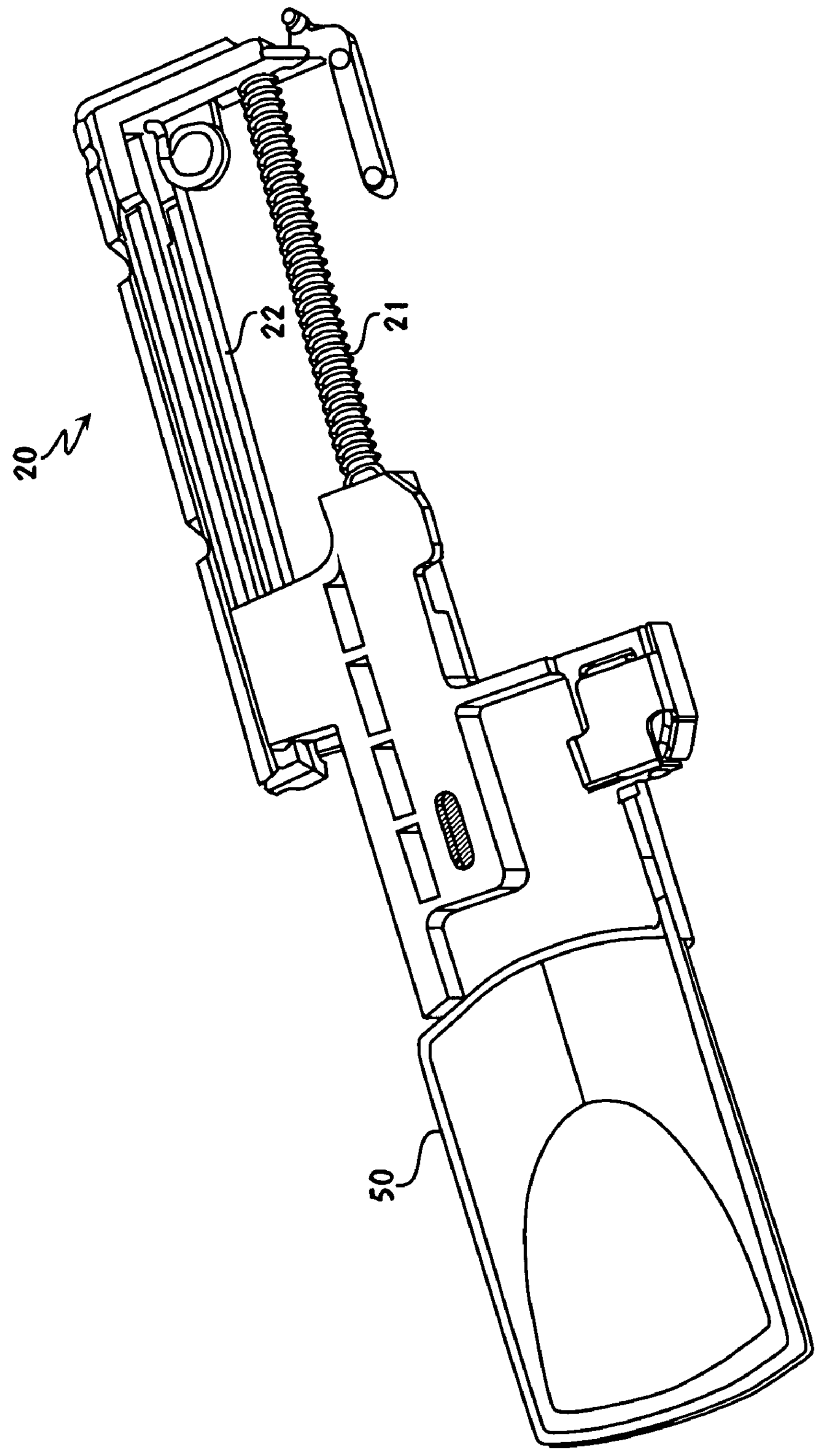
FIG. 3 is a view of an antennae unit in accordance with an embodiment of the present invention.

FIG. 3 is provided to illustrate an example of how antennae unite 50 may be arranged so that it may be extended from and inserted into communication module 10, although the scope of the present invention is not limited to this particular example. Antennae unit 50 may comprise an retraction device 20 that may include a compression spring 21 and a torsion spring 22. Compression spring 21 may be used to provide force to assist in extracting or extending antennae unit 50 from communication module 10. In alternative embodiments, the torsion spring may be used to make physical and/or electrical contact to antennae 55 (see FIG. 3), although it should be understood that the scope of the present invention is not limited in this respect. For example, the torsion spring may comprise conductive material that provides electrical connection to antennae 55 when antennae unit 50 is either extended from or inserted into communication module 10.

Figure 4:
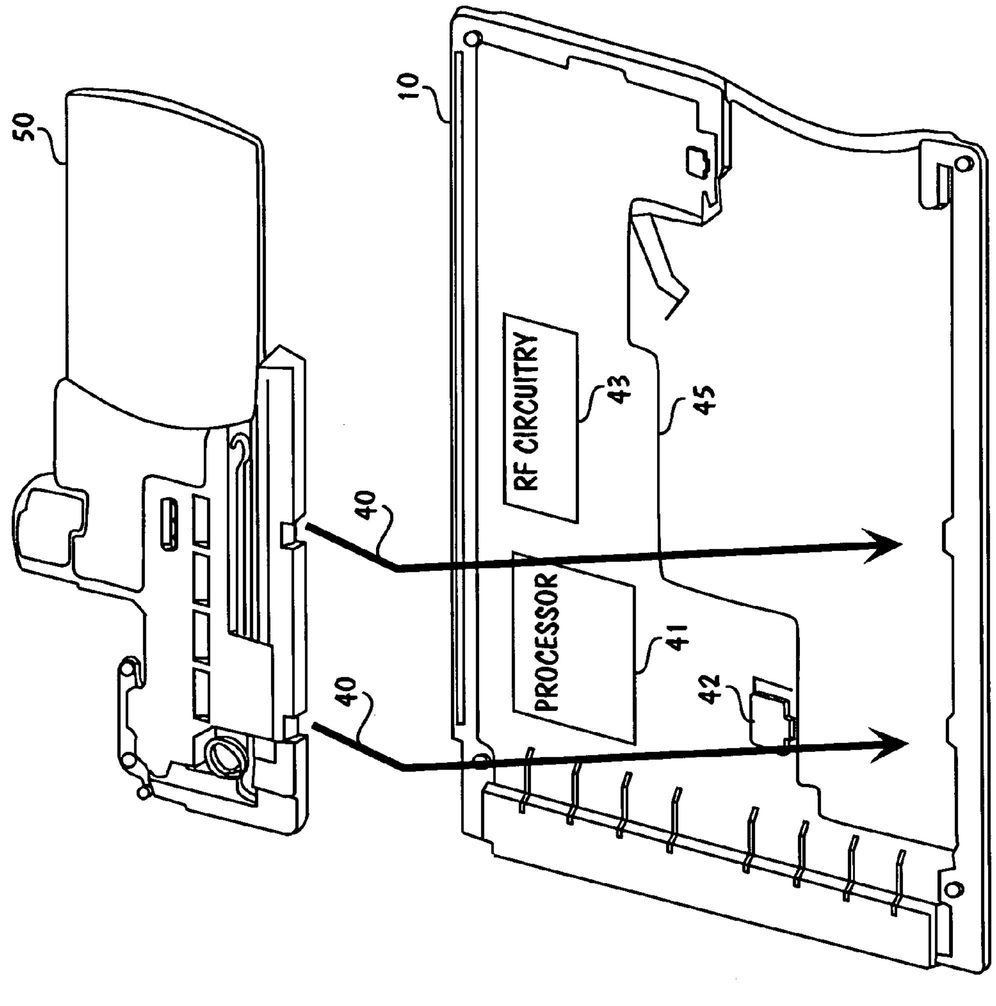
FIG. 4 is an illustration of an antennae unit and a communication module in accordance with an embodiment of the present invention.

FIG. 4 illustrates an example of how antennae unit 50 may be positioned within Communication module 10, although the scope of the present invention is not limited in this respect. As shown in FIG. 4, arrows 40 are used to indicate how antennae unit 50 may be positioned within communication module 10 while antennae unit 50 is in a retracted position.

Communication module 10 may further comprise a printed circuit board (PCB) 45 that may comprise various electronic devices used to generate, process, or receive wireless communications. For example, communication module 10 may comprise RF circuitry 43 (e.g., filters, multiplexers, etc.) and a processor 41 that may be used to perform the wireless communication on behalf of portable device 80. However, it should be understood that the scope of the present invention is not limited by the type or number of electronic components within communication module. 10.

Figure 5:
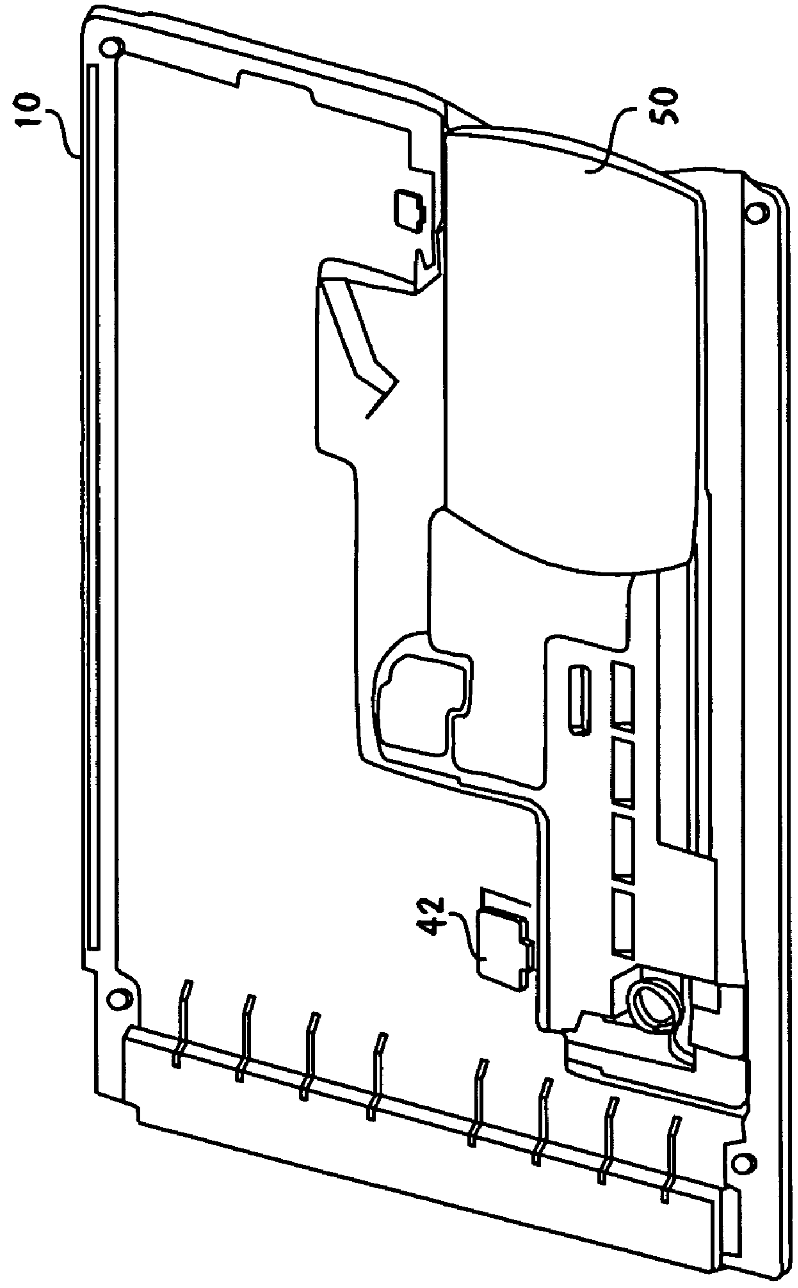
FIG. 5 is an illustration of an antennae unit and a communication module in accordance with an embodiment of the present invention.

Referring to FIG. 5, communication module 10 may comprise a switch 42 that is activated when antennae unit 50 is inserted into communication module 10. Although the scope of the present invention is not limited in this respect, switch 42 may be a “normally on” switch that is disabled when antennae unit 50 comes into physical contact with switch 42. For example, as antennae unit 50 is inserted into communication module 10, a portion of antennae unit 50 may come in contact with switch 42, which, in turn, disables communication module 10. However, in alternative embodiments, switch 42 may use other magnetic, optical, or electrical signals to sense that antennae unit 50 has either been inserted into or extracted from communication module 10.

As shown in FIG. 5, antennae unit may be inserted into communication module 10 such that all of antennae unit 50, and thus all of antennae 55, is contained within communication module 10. This may be desirable to reduce the risk that antennae unit 50 is damaged while it is not in use. However, it should be understood that the scope of the present invention is not limited in this respect. Alternatively, only a portion or a majority of antennae unit 50 may be contained within communication module 10 in order to disable the operation of communication module 10.

Referring back to FIG. 1, antennae unit 50 may be extracted from communication module 10 while communication module is in use. Although the scope of the present invention is not limited in this respect, antennae unit 50 may enable the operation of communication module 10 when it is extracted. The distance that antennae unit 10 may extend outward from communication module 10 may be adjusted as desired depending on such factors as the type of RF signals to be received or transmitted or the arrangement of antennae 55. In a particular embodiment, antennae unit may extend less than about 10 centimeters outward from communication module 10 when in communication module 10 is in operation. Alternatively, antennae unit 50 may be adapted such that only a small portion or a majority of antennae unit 50 may extend from communication module 10.

Again, when no longer in use, antennae unit 50, or at least a portion thereof, may be inserted into communication module 10. This, in turn, may be used as a technique for disabling communication module 10. However, communication module 10 may be adapted such that the insertion of antennae unit 50 only disables the operation of communication module 10 and has not affect on the operation of portable device 80 (see FIG. 1). Thus, portable device may continue to be operated by a user while antennae unit 50 is stowed in communication module 10.

While certain features of the invention have been illustrated and described herein, many modifications, substitutions, changes, and equivalents will now occur to those skilled in the art. For example, antennae unit 50 may also be used to disable portable device 80 when it is inserted into communication module 10. It is, therefore, to be understood that the appended claims are intended to cover all such modifications and changes as fall within the true spirit of the invention.

The invention claimed is:

1. A personal computer memory card international association card comprising:

a housing mountable in a personal computer;

an antenna reciprocatable in and out of said housing; and a torsion spring mounted in said housing, said spring including a coiled portion and an arm coupled to said coiled portion, said arm extending along a length of said housing and to stay in sliding spring biased contact with said reciprocating antenna.

2. The card of claim 1 wherein said spring makes electrical contact with said antenna.

3. The card of claim 1 wherein said spring is electrically conductive.

4. The card of claim 1 including a compression spring between said housing and said antenna.

5. The card of claim 1 wherein said arm is substantially straight.

* * * * *

UNITED STATES PATENT AND TRADEMARK OFFICE

CERTIFICATE OF CORRECTION

PATENT NO. : 7,620,435 B2
APPLICATION NO. : 09/745923
DATED : November 17, 2009
INVENTOR(S) : Tou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 572 days.

Signed and Sealed this

Twenty-sixth Day of October, 2010

David J. Kappos

*Director of the United States Patent and Trademark Office*